(12) United States Patent
Zhou

(10) Patent No.: US 8,872,994 B2
(45) Date of Patent: Oct. 28, 2014

(54) BACKPLANE OF LIQUID CRYSTAL DISPLAY DEVICE, BACK LIGHT MODULE, AND LIQUID CRYSTAL DISPLAY DEVICE

(75) Inventor: Gege Zhou, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 379 days.

(21) Appl. No.: 13/375,394

(22) PCT Filed: Oct. 27, 2011

(86) PCT No.: PCT/CN2011/081455
§ 371 (c)(1),
(2), (4) Date: Nov. 30, 2011

(87) PCT Pub. No.: WO2013/053156
PCT Pub. Date: Apr. 18, 2013

(65) Prior Publication Data
US 2013/0093976 A1    Apr. 18, 2013

(30) Foreign Application Priority Data
Oct. 12, 2011    (CN) .......................... 2011 1 0308570

(51) Int. Cl.
*G02F 1/1333* (2006.01)
*G02F 1/133* (2006.01)
*G02F 1/13* (2006.01)
*F21V 17/00* (2006.01)

(52) U.S. Cl.
CPC ................ *F21V 17/00* (2013.01); *G02F 1/133* (2013.01); *G02F 1/13* (2013.01)
USPC ............................................. 349/58; 349/65

(58) Field of Classification Search
CPC ............. F21V 7/00; G02F 1/133; G02F 1/13; G02F 1/133308; G02F 1/133615; G02F 2001/133314

USPC ............... 349/58, 59, 60, 61, 65; 361/679.21, 361/679.22, 679.26
See application file for complete search history.

(56) References Cited

U.S. PATENT DOCUMENTS

| | | | |
|---|---|---|---|
| 2007/0157487 A1* | 7/2007 | Hyun et al. | 36/118.9 |
| 2011/0255026 A1* | 10/2011 | Pan et al. | 349/61 |
| 2012/0105762 A1* | 5/2012 | Que | 349/60 |

FOREIGN PATENT DOCUMENTS

| | | |
|---|---|---|
| CN | 1467698 A | 1/2004 |
| CN | 201032505 Y | 3/2008 |

(Continued)

OTHER PUBLICATIONS

Automated computer translation of CN 101464572—Jun. 2009—pp. 1-12.*

(Continued)

*Primary Examiner* — Dung Nguyen
*Assistant Examiner* — Tai Duong
(74) *Attorney, Agent, or Firm* — IPro, Inc.; Na Xu

(57) ABSTRACT

The present invention discloses a backplane of liquid crystal display (LCD) device, back light module and LCD device. A backplane of LCD device comprises a mainboard; wherein, the side of the mainboard is provided with a shield on the rubber frame corresponding to the LCD device. The present invention extends the backplane of LCD device and covers exposed part of rubber frames. Because the backplane of LCD device has an intensity which is significantly higher than that of rubber frames and is not easily damaged during handling, the aim of protecting rubber frames and source pcbs is achieved. However, because the backplane of LCD device is adjacent to rubber frames, shields can be added directly in the backplane of LCD device. The process is simple and can minimize use of material for covering.

3 Claims, 2 Drawing Sheets

(56) References Cited

FOREIGN PATENT DOCUMENTS

| | | |
|---|---|---|
| CN | 101276080 A | 10/2008 |
| CN | 201207114 Y | 3/2009 |
| CN | 101464572 A | 6/2009 |
| CN | 101893211 A | 11/2010 |
| CN | 201680234 U | 12/2010 |
| CN | 101936509 A | 1/2011 |
| CN | 102042539 A | 5/2011 |
| JP | 10240153 A | 9/1998 |
| JP | 2004-272045 A | 9/2004 |
| JP | 2010204357 A | 9/2010 |
| KR | 20000014955 A | 3/2000 |

OTHER PUBLICATIONS

Zhang Hua, the International Searching Authority written comments, May 2012, CN.

Jia Yang, the first office action, Nov. 2012, CN.

* cited by examiner

BACKPLANE OF LIQUID CRYSTAL DISPLAY DEVICE, BACK LIGHT MODULE, AND LIQUID CRYSTAL DISPLAY DEVICE

TECHNICAL FIELD

The present invention relates to the field of liquid crystal display (LCD), and more particularly to backplane of LCD device, back light module, and LCD device.

BACKGROUND

As shown in FIG. 1, an existing LCD module comprises a back light module and a liquid crystal panel; wherein, the back light module comprises: a backplane of LCD device, a light guide plate, a light source, an optical membrane etc.; and the side of the LCD comprises components like rubber frames and front frames which connect and fix liquid crystal panel and back light module. The liquid crystal panel comprises the source pcb for driving liquid display; a cavity is arranged between the rubber frame and the front frame of the existing LCD device. The source pcb is arranged in the cavity and fixed on the rubber frame. However, the existing LCD device is often damaged during handling, thereby resulting in damages to the source pcb.

SUMMARY

One aim of the present invention is to provide a backplane of LCD device, back light module and LCD device of higher protection intensity.

The aim of the present invention is achieved by the following technical schemes:

A backplane of LCD device comprises a mainboard, wherein, the side of the mainboard is provided with a shield on the rubber frame corresponding to the LCD device.

Preferably, the mainboard and the shield are integrally formed. Such design can reduce the time of assembly at later stage, and increase the production efficiency.

Preferably, the edge of the mainboard is folded on the side near the rubber frame of the LCD device, in order to form an L-shaped shield to enclose the rubber frame. This is one specific form of the shield structure.

Preferably, the shield is fixed on the side of the mainboard. This is a technical scheme for separating the mainboard and the shield.

Preferably, the shield is a bracket with one side fixed on the side of the mainboard by riveting and the other side extending to the exposed position of the rubber frame of the LCD device to achieve complete covering. This is one embodiment of side-mounted bracket.

Preferably, the shield is fixed under the mainboard. This is another technical scheme for separating the mainboard and the shield.

Preferably, the shield is a bracket with one side fixed under the mainboard by riveting and the other side extending to the exposed position of the rubber frame of the LCD device to achieve complete covering. This is one embodiment of under-mounted bracket.

A back light module comprises said backplane of LCD device.

A LCD device comprises the liquid crystal panel and the back light module, wherein, sides of the liquid crystal panel and the back light module are provided with rubber frames. The source pcb of the liquid crystal panel is fixed on the inside of the rubber frame, wherein the LCD device also comprises said backplane of LCD device, and the shield of the backplane is correspondingly arranged outside the rubber frame.

It is found from the research by the inventor that the LCD device is often grasped from its sides during handling. However, rubber frames are just located on sides of the device and exposed on the back of the device. Rubber frames are easily damaged because of the weak intensity, thereby resulting in damages to source pcbs. The present invention extends the backplane of LCD device and covers exposed part of rubber frames. Because the backplane of LCD device has an intensity which is significantly higher than that of rubber frames and is not easily damaged during handling, the aim of protecting rubber frames and source pcbs is achieved. However, because the backplane of LCD device is adjacent to rubber frames, shields can be added directly in the backplane of LCD device. The process is simple and can minimize use of material for covering.

Wherein: 1. Front frame; 2. Rubber frame; 3. LED light bar; 4. Liquid crystal panel; 5. Light guide plate; 6. Reflector plate; 7. Mainboard; 8. Source pcb; 9. Shield; 10. Rivet.

DETAILED DESCRIPTION

The present invention will further be described in detail in accordance with the figures and the preferred embodiments.

Figure 1:
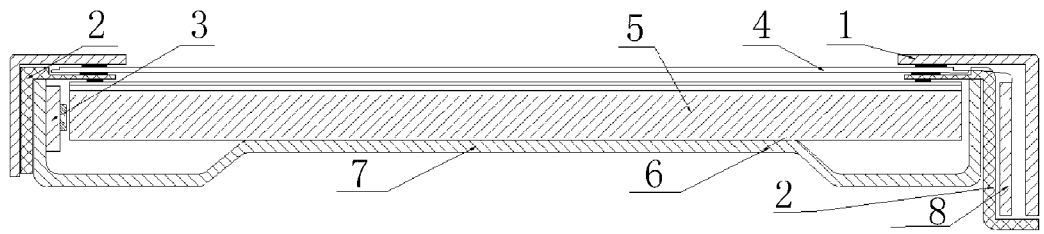
FIG. 1 is a schematic diagram of an existing LCD device.
Figure 2:
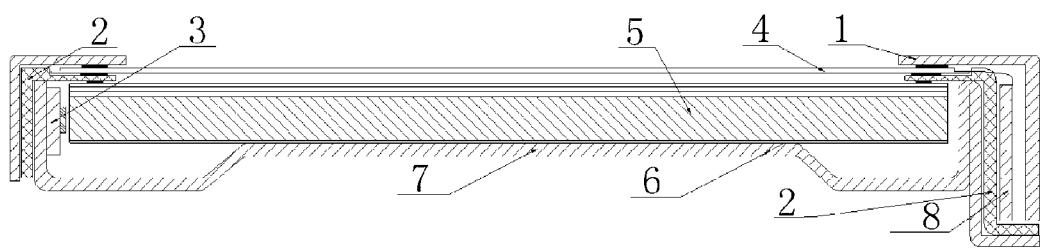
FIG. 2 is a schematic diagram of a LCD device of the present invention.

As shown in FIG. 2, a LCD device comprises a back light module and a liquid crystal panel 4; wherein, a mainboard 7 is under the back light module, and a reflector plate 6, a light guide plate 5 and a liquid crystal panel 4 are sequentially located on the mainboard 7. A LED light bar 3 is fixed on the position corresponding to the light incident surface of the light guide plate 5 on the side of the mainboard 7 of the backplane. The liquid crystal panel 4 and the back light module are fixed from sides by front frames 1 and separated from both sides by rubber frames 2 which extend to sides of the LCD device and is fixed on front frames 1. The liquid crystal panel 4 also comprises a source pcb 8 for driving liquid display which is fixed on the rubber frame 2 of one side of the liquid crystal panel 4. Because there is a source pcb 8 between the rubber frame 2 on this side and the front frame 1, the rubber frame 2 needs to bypass under the source pcb 8 and be fixed on the front frame 1; therefore, the exposed part is formed and easily to be damaged during handling. In order to solve the problem of easy damage of the rubber frame 2, a shield 9 is arranged outside the position corresponding to rubber frames 2 of the LCD device on the side of the mainboard 7.

Embodiment 1

Figure 3:
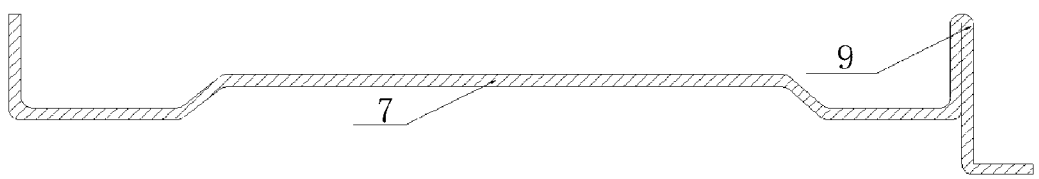
FIG. 3 is a schematic diagram of a LCD device of embodiment 1 of the present invention.

As shown in FIG. 3, the side wall of the backplane is folded on the side near the source pcb 8, in order to form an L-shaped shield 9 to enclose the rubber frame 2. Operators can directly grasp the backplane. Because the intensity of the backplane is significantly higher than that of rubber frames 2, rubber frames 2 will not be damaged during handling; therefore, the source pcb is properly protected and fixed. For plastic backplanes, mainboards 7 and shields 9 of backplanes can be designed in a set of mold and processed.

In addition, the edge of the mainboard can also be folded on the side near the rubber frame of the LCD device, in order to form an L-shaped shield to enclose the rubber frame.

Embodiment 2

Figure 4:
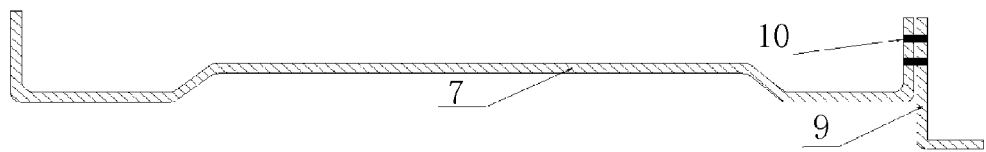
FIG. 4 is a schematic diagram of a backplane of LCD device of embodiment 2 of the present invention.

As shown in FIG. 4, the shield is an independent bracket with one end covering the rubber frame 2 and the other end fixed on the side of the mainboard 7 by riveting, screw or sticking.

Embodiment 3

Figure 5:
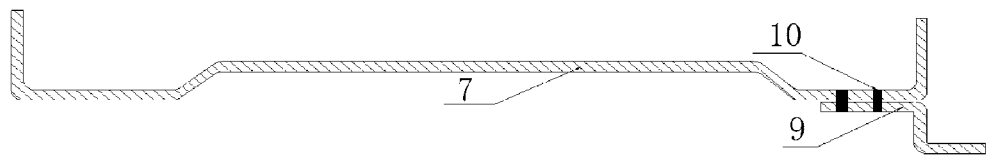
FIG. 5 is a schematic diagram of a backplane of LCD device of embodiment 3 of the present invention.

As shown in FIG. 5, the shield is an independent bracket with one end covering the rubber frame 2 and the other end fixed under the mainboard 7 by rivets 10, screws or sticking.

The present invention is described in detail in accordance with the above contents with the specific preferred embodiments. However, this invention is not limited to the specific embodiments. For the ordinary technical personnel of the technical field of the present invention, on the premise of keeping the conception of the present invention, the technical personnel can also make simple deductions or replacements, and all of which should be considered to belong to the protection scope of the present invention.

The invention claimed is:

1. A backplane of liquid crystal display (LCD) device, comprising: a mainboard; a side of the mainboard is provided with a shield corresponding to a rubber frame of the LCD device, wherein the shield is fixed under the mainboard, wherein the shield is a bracket with one side fixed under the mainboard by riveting and the other side extends to an exposed position of the rubber frame of the LCD device to completely cover the rubber frame.

2. A back light module comprises a backplane of LCD device, wherein the backplane of the LCD device comprises a mainboard; a side of the mainboard is provided with a shield corresponding to a rubber frame of the LCD device, wherein the shield is fixed under the mainboard, wherein the shield is a bracket with one side fixed under the mainboard by riveting and the other side extends to an exposed position of the rubber frame of the LCD device to completely cover the rubber frame.

3. A LCD device, comprising: a liquid crystal panel and a back light module; sides of the liquid crystal panel and the back light module are provided with a rubber frame; a source pcb of the liquid crystal panel is fixed inside of the rubber frame; the LCD device also comprises a backplane and a mainboard; a side of the mainboard is provided with a shield corresponding to a rubber frame of the LCD device, wherein the shield is fixed under the mainboard, wherein the shield is a bracket with one side fixed under the mainboard by riveting and the other side extends to an exposed position of the rubber frame of the LCD device to completely cover the rubber frame.

* * * * *